United States Patent [19]

Tschann

[11] Patent Number: 5,277,458
[45] Date of Patent: Jan. 11, 1994

[54] CHAINS FOR PIPE FLANGE CONNECTIONS HAVING AN ELECTRIC TIGHTENER

[76] Inventor: Edgar Tschann, Gantschierstrasse 701, A-6771 Bartholomäberg, Austria

[21] Appl. No.: 8,075

[22] Filed: Jan. 22, 1993

Related U.S. Application Data

[63] Continuation of Ser. No. 720,875, Jun. 25, 1991, abandoned.

[51] Int. Cl.⁵ .............................................. F16L 23/04
[52] U.S. Cl. ........................................ 285/411; 24/19; 285/367; 285/405
[58] Field of Search ............... 285/411, 367, 178, 410, 285/414, 405; 24/19, 268

[56] References Cited

U.S. PATENT DOCUMENTS

| | | | |
|---|---|---|---|
| 2,640,717 | 6/1953 | Scheuring | 285/411 |
| 2,689,141 | 9/1954 | Kiekhaefer . | |
| 2,775,806 | 1/1957 | Love | 285/411 |
| 2,788,993 | 4/1957 | Oldham | 285/367 |
| 3,181,901 | 5/1965 | Watts | 285/367 |
| 3,600,770 | 8/1971 | Halling | 285/411 |
| 4,123,095 | 10/1978 | Stehlin | 285/411 |
| 4,341,406 | 7/1982 | Abbes et al. | 285/411 |
| 4,488,744 | 12/1984 | Bubeck et al. | 285/411 |
| 4,568,115 | 2/1986 | Zimmerly . | |
| 4,722,561 | 2/1988 | Heckethorn | 285/411 |

FOREIGN PATENT DOCUMENTS

| | | |
|---|---|---|
| 0027406 | 4/1981 | European Pat. Off. . |
| 0202805 | 11/1986 | European Pat. Off. . |
| 1051585 | 2/1959 | Fed. Rep. of Germany ...... 285/367 |
| 3000504 | 1/1979 | Fed. Rep. of Germany . |
| 8516266 | 4/1985 | Fed. Rep. of Germany . |
| 3633380 | 4/1988 | Fed. Rep. of Germany . |
| 1073967 | 9/1954 | France . |
| 736879 | 9/1955 | United Kingdom ............... 285/367 |
| 1472750 | 5/1977 | United Kingdom ............... 285/367 |
| 2084235 | 4/1982 | United Kingdom . |

Primary Examiner—Eric K. Nicholson
Attorney, Agent, or Firm—Ladas & Parry

[57] ABSTRACT

A chain intended for pipe flange connections comprising successive, cross-sectionally U-shaped chain links 8, which are hinged directly to each other and form a ring sector-like contact area 14, 15, 17 and 18. At the contact point of the chain links 8, following on to the eye ring 9, an interstice 13 is provided. Moreover, an interstice 11 is likewise provided between the two flanks 31, 32 of the U-shaped chain links 8 and the two pipes 1, 2 to be connected. The contact points of the chain links 8 are designed as level annular segmental contact surfaces 17, 18 and rest on the likewise level, chamfered outer surfaces 14, 15 of the pipe flanges 3, 4.

2 Claims, 2 Drawing Sheets

CHAINS FOR PIPE FLANGE CONNECTIONS HAVING AN ELECTRIC TIGHTENER

This is a continuation of co-pending application Ser. No. 07/720,875 filed Jun. 15, 1991 now abandoned.

BACKGROUND OF THE INVENTION

1. Field of the Invention

The invention relates to chains for pipe flange connections, in particular pipes for the application of vacuum or for conducting high pressure media, in which chain successive chain links are directly linked with each other in articulated manner and have wedge shaped contact surfaces in cross section so as to embrace and grip the pipe flanges of joined pipe ends to be connected and in which the ends of the chain are connected with a connection and tightening element.

2. Discussion of the Prior Art

Chains of this type have become known by GB-PS 2 084 235. With these chains the chain links rest on the pipe flanges by means of ball rollers or the like. This chain causes angularly spaced holding pressures to be exerted on the pipe flanges, in each case over a narrow distance only, thus resulting in insufficient sealing and the compression loading of the individual support points leading to premature wear and tear and inadmissible deformation of the individual sealing parts.

SUMMARY OF THE INVENTION

It is the object of the present invention to overcome the deficienies cited and to attain a satisfactory sealing of the pipe flange connections. This problem is solved in a chain of the type mentioned in the opening paragraph in that according to the invention the contact points of the chain links are designed as annular segmental contact surfaces and resting on chamfered outer surfaces of the pipe flanges. This measure causes the area of application of the chain links on the pipe flanges to be substantially increased compared to the known chains thus improving the sealing effect. This is of special importance, in particular, for vacuum pipes or pipe lines for high pressure media. Moreover, a lesser wear and tear of the contact areas takes place during the surface contact than in the cases of point or line contact when using balls or rollers respectively.

BRIEF DESCRIPTION OF THE DRAWINGS

Further particulars of the invention are explained in more detail by means of the drawing in which two working examples of the chain are demonstrated.

Figure 1:
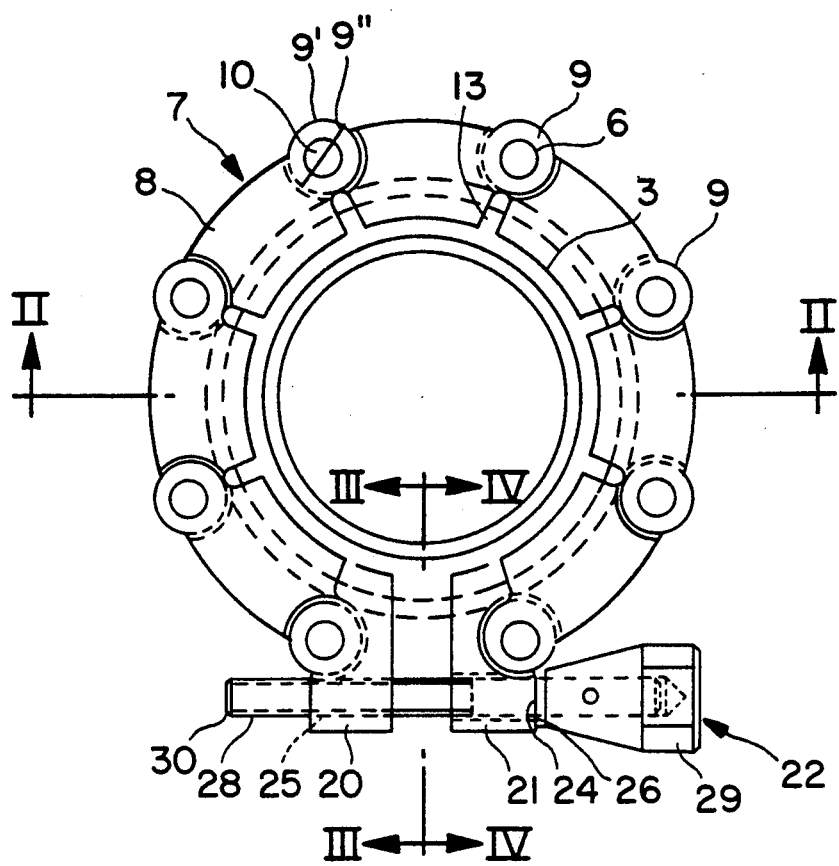
FIG. 1 shows a plan view of an embodiment of the invention.
Figure 2:
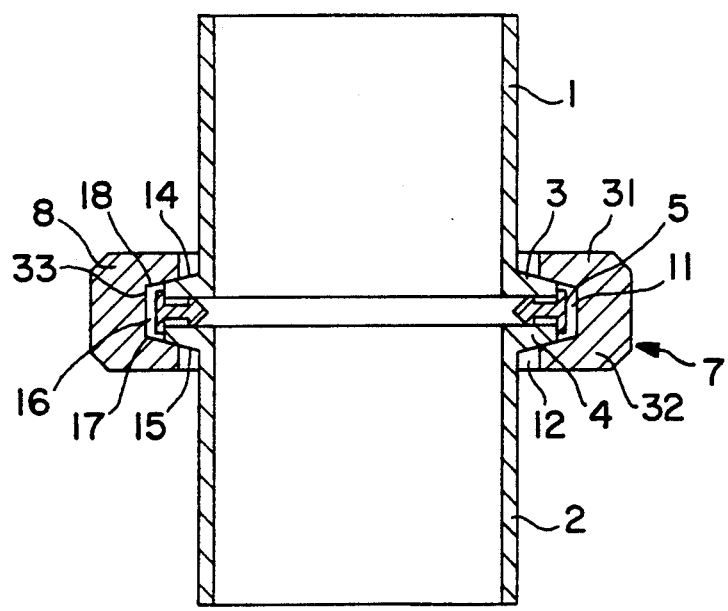
FIG. 2 shows a section along the line II—II of FIG. 1.
Figure 3:
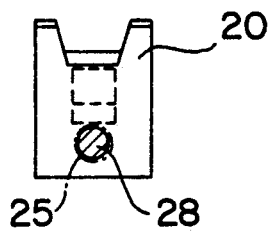
FIG. 3 shows a section along the line III—III of FIG. 1.
Figure 4:
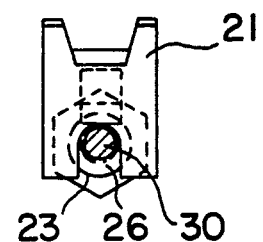
FIG. 4 shows a section along the line IV—IV of FIG. 1.

DESCRIPTION OF THE PREFERRED EMBODIMENTS 1 and 2 denote two pipe lines which, on the ends to be linked, each comprise a flange 3 and 4 respectively, between which a seal 5 is accommodated which may, for example, be a metal seal. Both pipe flanges 3 and 4 have chamfered outer surfaces 14 and 15 respectively, converging outwardly. A chain 7 with chain links 8 which at their ends are directly linked in articulated manner, serves to connect the pipe flanges 3 and 4. For that purpose the chain links 8 are each provided at both ends with an eye ring 9, which come to rest in superimposed manner and are linked by means of chain pins 10 connecting the eye ring opening 6 of the eye rings 9. Preferably the chain link 8 is provided on its one end with two eye rings 9" arranged in forked manner and at its other end with one single eye ring which comes to rest between the fork 7" of the neighbouring chain link. The chain links 8 are formed as annular segments the axis of which coincides with the axis of the pipe lines 1 and 2. The chain links 7 are provided with a wedge-shaped aperture 16, the chamfered side surfaces 17 and 18 of which include an angle which essentially equals the angle which the chamfered surfaces 14 and 15 of the flanges 3 and 4 include so that in the position of application the chain links 7 with their level, annular sector-like surfaces 17, 18 come to rest fully on the likewise level surfaces 14, 15. Between the two neighbouring chain links 8, following on the eye rings 9 interstices 13 are provided at the contact points, which, as will be explained later in more detail, allow for an adjustment in the case of wear and tear of the contact surfaces, respectively the bearing surfaces 14, 15, and 17, 18 respectively.

In the scope of the invention other constructive solutions regarding the connection of chain links 8 may, of course, also be provided. It is thus possible to use also a single eye ring 9', instead of the forked eye ring 9", in which case the eye rings 9 of the contact points of neighbouring chain link 8 come to rest in superimposed manner.

The last two links of the link chain 7 are designed as support links 20, 21 and serve for receiving a tension element, in the present case a tightening screw 22. For that purpose one of the support links 20, 21, in the demonstrated working example, the support link 20, is provided with a threaded hole 25 into which the tightening screw 22 with a threaded portion 28 of its pin 30 is screwed while the end of the pin 30 bordering on the tightening screw head 29 is embedded in a slot 23 of the other support link 2 in which context the tightening screw 22 in the position of application supports itself with its head 29 on the outer bearing surface 24 of the support link 21 by way of interposition of a disk 26.

Due to the plurality of the chain links 8 with their bearing surface extending over the entire length of the same, an almost closed bearing ring is formed achieving an optimum sealing action on both flange surfaces to be sealed. This results in relatively minor wear and tear of the sealing surface which is balanced by simple adjustment of the tightening screw 29 so that in each case the greatest sealing action can be achieved. Through the interposition of a correspondingly strong spring between the head 29 and the front region 24, an automatic adjustment of the link chain 7 can be achieved. The adjusting movement is connected with a reduction of the interstice 13. In this connection an interstice 11 is also provided between the base 33 of the space enclosed by the flanks 31, 32 of the chain links 8 and the flanges 3 and 4, the seal 5 of the pipe lines 1 and 2 and between the said flanks 31 and 32 and the pipe lines 1 and 2, an interstice 12 is provided which likewise decreases.

If the chain 7 is to be removed from the pipe flanges 3 and 4, it suffices to loosen the tightening screw 22, whereupon the latter, with the support link 22 into which it is screwed, is swivelled around the joint axis 27 of the same in the direction of arrow A thus causing the tightening screw 22 to emerge from the slot 23.

The chain 7 according to the invention also permits the adaptation of the same to different pipe diameters depending on the depth or height of the interstices 11, 12 and 13.

Figure 5:
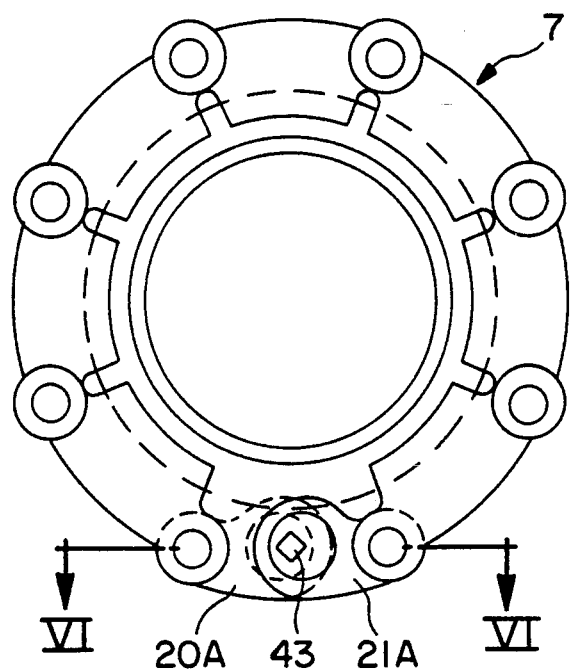
FIG. 5 shows a plan view of a second embodiment of the invention.
Figure 6:
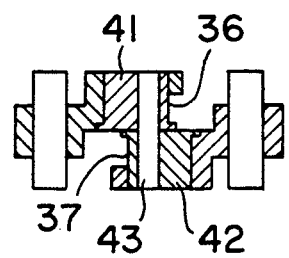
FIG. 6 shows a section along the line VI—VI of FIG. 5.

The construction of the chain 7 according to FIGS. 5 and 6 is distinguished from that according to FIGS. 1 to 4 solely by the design of the support links 20, 21, which in the present case are denoted as 20A and 21A. The latter, on their ends facing each other, are each provided with an eye ring 34 and 35 respectively, having a circular hole, into which eye ring a cylindrical disk 41, 42 respectively with an eccentrically situated hole 36, and 37 respectively, is embedded. In cross-section the two holes 36 and 37 have a profile, in the present case they are squarely formed, and serve for receiving a pin 43 due to the swivelling of which by means of a tool the chain 7 is tightened or loosened. After removing the pin 23 from the holes 36 and 37, the link chain 7 can be removed from the flanges 3, 4. In this case the pin 43 may likewise be subjected to the load of a spring, not shown, thus ensuring an automatic adjustment of the chain 7 in the event of wear and tear of the contact pressure surfaces.

I claim:

1. A pipe flange connection for pipes carrying a vacuum or for conducting high pressure media, in which two adjacent ends of two adjacent pipelines are to be connected, each of said ends comprising an integral flange, the outer surface of the flanges of said ends having outer surfaces converging outwardly to define chamfered outer surfaces, said pipe flange connection comprising:

a chain having successive chain links, each link having at least one annular rings on each end with the openings in said rings in registration;

a pin passing through and articulated in the openings in said registered rings at the junction of each pair of adjacent links, said links having wedge-shaped contact surfaces in cross-section which embrace and grip the pipe flanges of joined pipeline ends to be connected; and a connection and tightening element for connecting the ends of the chain; wherein:

the contact surfaces of the chain links are designed as annular segmental contact surfaces which rest fully on the chamfered outer surfaces of the pipe flanges and form a segmented wedge-shaped annular groove receiving said flanges, with the curvature of the chamfered contact surfaces corresponding to that of the pipe flanges, whereby interstices are provided between two neighboring chain links; and each of said chain links at the end of the chain includes a support link articulated at the end of said chain link, each of said support links comprising:

an annular ring having a circular hole therein;

a cylindrical member articulated in said circular hole, said cylindrical member having an eccentrically situated axial hole of non-circular shape in cross-section; and a connecting pin;

whereby said two cylindrical members are adjustably connected against each other by way of said connecting pin penetrating said non-circular holes, said connecting pin conforming, in cross-section, to the cross-section of the holes.

2. A pipe flange connection according to claim 1, wherein said at least one annular ring on the ends of each link includes a pair of spaced annular rings on one end and a single annular ring on the other end, each said pair of rings adapted to receive the single ring of an adjacent link with the openings in all said rings in registration.

* * * * *